March 26, 1963 H. E. STOVER 3,082,911
MECHANISM FOR FEEDING CLOSURE CAPS
Filed Aug. 29, 1960
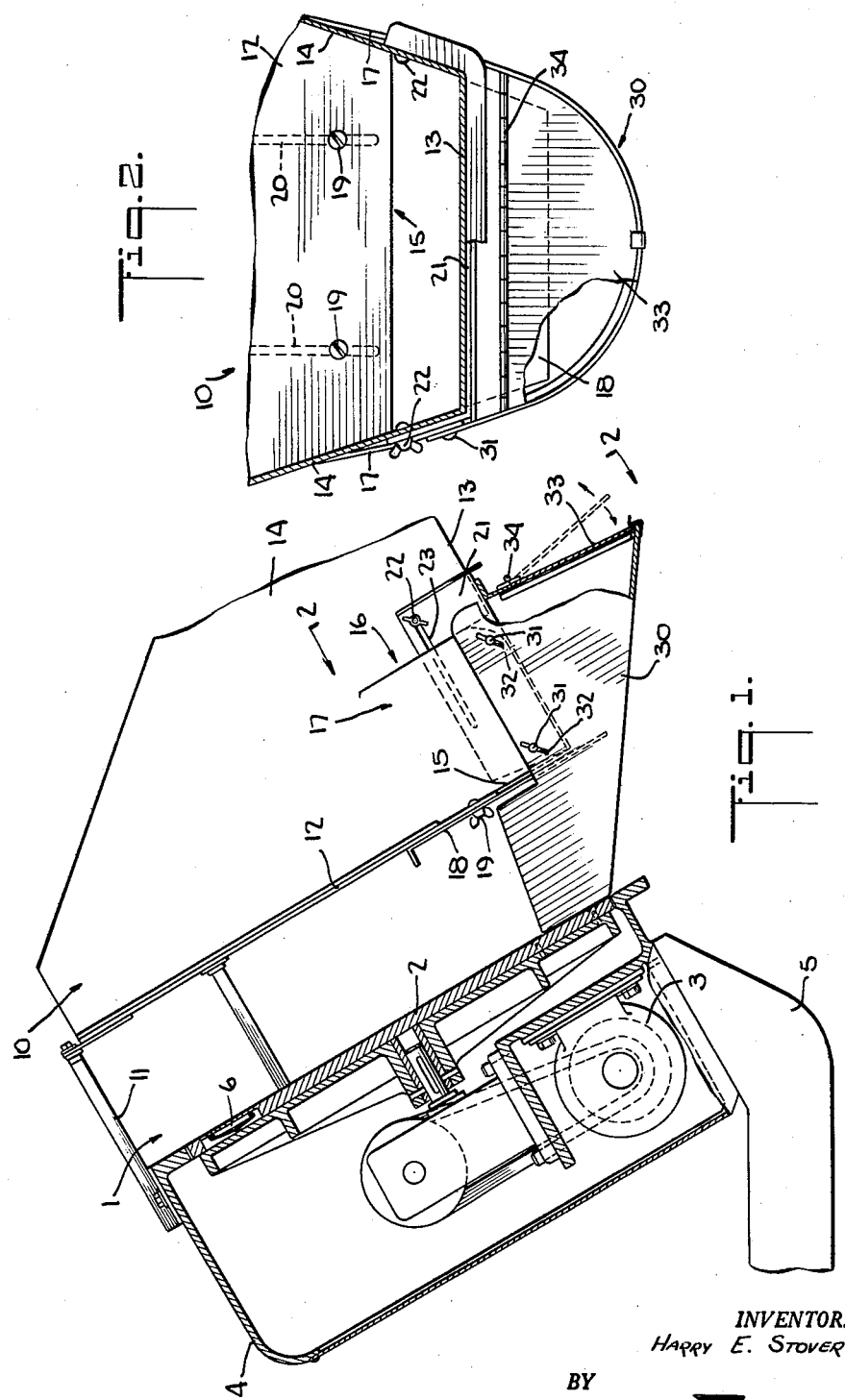
INVENTOR.
HARRY E. STOVER
BY
Donnand R. Holland
ATTORNEY 3,082,911
MECHANISM FOR FEEDING CLOSURE CAPS
Harry E. Stover, Lancaster, Ohio, assignor to Anchor Hocking Glass Corporation, Lancaster, Ohio, a corporation of Delaware
Filed Aug. 29, 1960, Ser. No. 52,392
1 Claim. (Cl. 221—174)

The present invention relates to a mechanism for feeding closure caps and more particularly to a mechanism for feeding closure caps to a hopper for subsequent delivery to a container sealing mechanism.

Hoppers for such sealing mechanisms usually comprise a rotatable disc in which closure caps are deposited. The rotating disc arranges the closure caps one behind the other in a single-file fashion and delivers each cap to a sealing mechanism which applies the closure cap to a container to form a sealed package. Such hoppers are also usually provided with mechanisms which will invert improperly positioned closure caps and reject defective caps so that properly positioned closure caps only are delivered to the sealing mechanism.

However, such hoppers are able to handle only a limited number of closure caps at one time and it has been necessary to continuously replenish the hopper with caps in order to permit the hopper to deliver a continuous supply of closure caps to the sealing mechanism. It will be seen that the requirement for constant replenishing is time-consuming and expensive.

Attempts have been made to overcome this problem by utilizing a bin above the hopper which will feed closure caps continuously to the hopper. However, with such bins it has been difficult to regulate the rate and continuity of caps fed to the hopper and also it has been difficult to obtain access to the inside of the hopper in the event that there is a jam-up of caps therein.

The present invention overcomes these difficulties and has for one of its objects the provision of an improved mechanism for automatically and continuously feeding closure caps to a hopper at a substantially uniform rate.

Another object of the present invention is to provide an improved bin for a hopper which will eliminate the necessity of frequently replenishing the hopper with closure caps.

Another object of the present invention is to provide an improved mechanism which permits the number of caps delivered to the hopper to be regulated.

Another object of the present invention is the provision of an improved means for permitting access to the interior of the hopper to remove excess caps and to permit the operator to break-up any jam-up of caps.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side view, partly in section, showing the elevated bin of the present invention in its operative position; and FIG. 2 is a sectional view thereof taken along line 2—2 of FIG. 1.

Referring more particularly to FIG. 1, the hopper 1 comprises a disc 2 rotatable by a suitable motor 3 mounted in a gear box 4 which is affixed at an angle to a frame 5 of the machine. The rotating disc 2 has a plurality of magnets 6 in its periphery which hold the caps at the edge of the disc and permit the closure caps to be arranged in single-file fashion one behind the other so as to be delivered one-by-one by a suitable passageway (not shown) to a container sealing machine (not shown).

Located above the hopper 1 is an elevated reservoir or bin 10 mounted on the gear box 4 of the hopper 1 by means of suitable brackets 11 spaced about 120 degrees apart around the gear box 4. The elevated bin 10 has a bottom wall 12, a front wall 13, and a pair of side walls 14. The bottom wall 12 terminates short of the front wall 13 and the front wall 13 terminates short of the bottom wall 12 to provide an opening 15 which will permit closure caps to be delivered from the bin 10 onto the rotating disc 2 of the hopper 1. The forward portions of the side walls 14 are slit at 16 to form a pair of flaps 17 for a purpose which will be described hereinafter.

To adjust the opening 15 so that the number of closure caps delivered to the rotating disc 2 may be regulated, the front wall 13 of the bin 10 is provided with a vertically movable front door 21 which is mounted for sliding movement inside the flaps 17 of the side walls 14 of the bin 10 by any suitable means, such as wing-nuts 22 mounted in slots 23 in the door 21. When the wing-nuts 22 are loosened the front door 21 may be slid up or down to regulate the opening 15.

In order to further adjust the opening 15 the bottom wall 12 of the bin 10 is provided with a bottom door 18 mounted for slidable movement thereon by any desired means, such as wing-nuts 19 movable in a plurality of slots 20 on the bottom door 18 and extending through bottom wall 12. It will be observed that loosening of the wing-nuts 19 permits the slidable bottom door 18 to be retracted or extended so as to adjust the opening 15 in the bin 10.

The cooperation between the slidable front door 21 and the slidable bottom door 18 will regulate the opening 15 of the elevated bin 10 so that a regulated amount of closure caps may be fed from the elevated bin 10 to the rotating disc 2 of the hopper 1. It will be seen that with this structure the bin 10 is filled with closure caps which are then fed to the rotating disc 2 through opening 15 at a continuous and uniform rate and that the necessity of constant replenishment is eliminated.

A chute 30 connects the elevated bin 10 to the hopper 1 and acts as a passageway to direct caps from the bin 10 to the rotating disc 2. The chute 30 is mounted on the outside of flaps 17 of the side walls 14 of the bin 10 by suitable fastening means, such as nuts 31 which lie in arcuate slots 32 in the chute 30 permitting adjustment thereof. The chute 30 is provided with a lid 33, hingedly mounted thereto at 34, which may be lifted (as shown in dotted lines in FIG. 1) to permit the operator to insert his hand therein to remove excess caps after the machine has been stopped or to break up any jam-ups of caps within the chute 30.

In operation, a large quantity of closure caps is deposited in the bin 10. The bottom door 18 and the front door 21 are adjusted so that the opening 15 formed thereby is sufficient to permit a uniform amount of closure caps to be continuously fed to the rotating disc 2 of the hopper through the chute 30. The closure caps are then aligned in end-to-end relationship by the rotating disc 2 and delivered to a sealing machine (not shown).

As the closure caps are delivered to the sealing machine by the rotating disc 2 a new supply of closure caps is fed down from the elevated bin 10 through the chute 30. It will be seen that if a sufficient number of closure caps are deposited in the bin 10 the hopper may operate for long periods of time without the necessity of being replenished.

If it is required to operate the machine at a faster rate so that more caps are to be fed to the rotating disc 2, it is merely necessary to enlarge the opening 15 by raising the front door 21 and retracting the bottom door 18 so that a greater number of caps are passed to the rotating disc 2. On the other hand, if it is desired to operate the machine at a slower rate, lowering of front door 21 and extending bottom door 18 makes opening 15 smaller so that a lesser amount of caps are fed to the disc 2.

If the closure caps jam-up in the chute or on the disc 2 or if caps are to be removed from the hopper after the machine is stopped the operator raises the lid 33 and passes his hand into the chute 30 to break the jam-up and or remove the caps.

It will thus be seen that the present invention provides an improved mechanism for continuously and uniformly feeding closure caps to a hopper without the necessity of frequent replenishing of the closure caps and which will permit regulation of the number of caps delivered and at the same time will permit access to the interior of the hopper.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

A mechanism for feeding articles comprising a rotatable hopper, an article reservoir having a first wall and a second wall angled with respect to the first wall, said first wall facing said hopper and spaced therefrom, a first opening along said first wall, a first door slidably mounted on said first wall and slidable to permit adjustment of said first opening, said second wall having a second opening communicating with said first opening, a second door slidably mounted on said second wall and slidable to permit adjustment of said second opening, said second door having a major portion thereof located on said outside of said reservoir to permit the second door to be slidably adjusted from the outside, a chute communicating with said first and second openings and extending from said reservoir to said hopper to deliver articles from said reservoir to the hopper, said chute having an opening therein to permit access to its interior, and a lid pivotally mounted on said chute adapted to close said opening.

References Cited in the file of this patent

UNITED STATES PATENTS

| | | |
|---|---|---|
| 1,057,074 | Miller | Mar. 25, 1913 |
| 1,146,024 | Rumney | July 13, 1915 |
| 1,394,908 | Kelling | Oct. 25, 1921 |
| 1,476,222 | Salfisberg | Dec. 4, 1923 |
| 1,880,287 | Sifton | Oct. 4, 1932 |
| 2,112,291 | Johnson | Mar. 29, 1938 |
| 2,198,137 | Suppiger | Apr. 23, 1940 |
| 2,715,978 | Sterling | Aug. 23, 1955 |
| 2,815,148 | Day et al. | Dec. 3, 1957 |
| 2,863,588 | Stover | Dec. 9, 1958 |
| 2,921,713 | Zanotto et al. | Jan. 19, 1960 |

FOREIGN PATENTS

| | | |
|---|---|---|
| 75,649 | Denmark | Mar. 30, 1953 |